United States Patent Office 2,824,890
Patented Feb. 25, 1958

2,824,890

ADDUCTS OF HALOGENATED BENZENE SULFENYL HALIDES AND VINYL ESTERS AND PROCESS

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,491

8 Claims. (Cl. 260—488)

This invention relates to ester products and more particularly to the products of the reaction of vinyl esters of carboxylic acids with halogenated aromatic sulfenyl halides.

In accordance with this invention, a halobenzenesulfenyl halide is reacted with the vinyl ester of an aliphatic carboxylic acid to produce a complex reaction product comprising compounds containing sulfur atoms and carboxylate radicals. The reaction involves equimolecular amounts of the sulfenyl halide and vinyl ester reactants, and is believed to proceed with the formation of an adduct, as illustrated by the following equation:

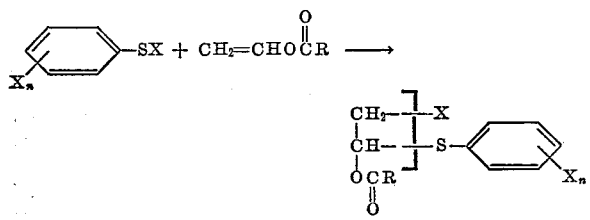

where X represents chlorine or bromine, R represents a lower alkyl radical, containing from 1 to 6 carbon atoms, and n represents an integer of from 1 to 5.

The position of the halophenylthio radical and of the halogen atom derived from the sulfenyl halide radical are not known with certainty, and for this reason the above non-commital formula is used. While the formation of α-halo-β-thioalkyl esters in certain related reactions has been reported, our experiments have shown that the various types of sulfenyl halides differ greatly in reactivity; thus, unsaturated compounds react with a haloaryl sulfenyl halide which do not undergo reaction with a nitroaryl sulfenyl halide or with a halogenated alkanesulfenyl halide such as perchloromethyl mercaptan, and which may react differently with a halogenated alkanesulfenyl halide than with a halogenated aromatic sulfenyl halide. The nature of the olefinic addend also affects the product of reaction with a given sulfenyl halide, certain olefinic compounds yielding well-defined individual adducts as products, whereas others result in the formation of a complex reaction product comprising mixtures of unsaturated materials and compounds having the elementary analytical composition of adducts, these adducts appearing to be present in the form of mixed isomers.

In the present instance, the product of reaction of a halobenzene sulfenyl halide with a vinyl ester of an aliphatic carboxylic acid presents difficulties in the isolation and characterization thereof, and we prefer not to be bound by speculation as to its precise nature.

The presently-preferred sulfenyl halides are benzenesulfenyl bromides and chlorides, wherein the benzene ring is substituted by from 1 to 5 chlorine and/or bromine atoms. Exemplary of presently useful halobenzenesulfenyl halides are p-chlorobenzenesulfenyl chloride, p-bromobenzenesulfenyl chloride, 2,4-dichlorobenzenesulfenyl chloride, 3,4-dichlorobenzenesulfenyl chloride, 2,5-dichlorobenzenesulfenyl chloride, 2,4,5-trichlorobenzenesulfenyl chloride, 2-bromo-3,4-dichlorobenzenesulfenyl bromide, 2,3,4,5 - tetrachlorobenzenesulfenyl chloride, pentachlorobenzenesulfenyl chloride, etc.

The vinyl esters useful in preparing the products of this invention are the esters of saturated aliphatic carboxylic acids of from 1 to 6 carbon atoms. Such esters can be obtained, e. g., by the addition of acetylene to the corresponding acids. Vinyl acetate is the preferred ester for the preparation of the present products; other vinyl esters which may be reacted with the sulfenyl halide in accordance with this invention include, e. g., vinyl propionate, vinyl butyrate, vinyl isobutyrate, vinyl n-hexanoate, etc.

The new ester products are prepared by reacting a halobenzenesulfenyl halide as defined above with one of the presently useful vinyl esters to form a reaction product comprising compounds containing sulfur atoms and carboxylate radicals, where by a carboxylate radical is here meant a radical of the form

where R represents the organic radical attached to the carbonyl carbon atom. The process of the invention appears to involve the reaction of equimolecular amounts of sulfenyl halide and vinyl ester, but if desired an excess of the more readily available component may be present in the reaction mixture to serve, e. g., as a reaction diluent. In accordance with the present process, the two reaction components are contacted for a time such as to produce a reaction product comprising compounds containing both sulfur atoms and carboxylate radicals. The rapidity of the reaction varies greatly depending on the reactants chosen, and may be sufficiently exothermic to require cooling and/or diluents to moderate the violence of the reaction or may not reach completion until after a period of refluxing at elevated temperatures. Suitable inert solvents or diluents which may be employed in the reaction mixture if desired include hydrocarbons such as benzene or hexane, halogenated solvents such as chloroform or ethylene dibromide, oxygenated solvents free of active hydrogen, e. g., ether or dioxane, etc. A particularly preferred class of solvents are anhydrous organic carboxylic acids and especially glacial acetic acid, since this solvent also has the advantage of acting as a catalyst for the reaction. Mixtures of glacial acetic acid and an inert solvent such as ethylene dichloride may also be used as a reaction medium if desired.

To accelerate the rate of reaction when desired, heating and catalysts are employed. Suitable temperatures for carrying out the reaction comprise, e. g., any temperature from below room temperature up to temperatures below the decomposition temperature of the reaction mixture constituents. Acid catalysts are useful in accelerating the present reaction; in addition to the organic carboxylic acid catalysts mentioned above, there may alternatively be used Friedel-Crafts catalysts such as aluminum trichloride or boron trifluoride complexes. Pressure variation may also be utilized to facilitate conducting the reaction if desired.

Since the present vinyl esters may be susceptible to thermal polymerization, the reaction may, if desired, be conducted in the presence of polymerization inhibitors. Examples of suitable inhibitors are hydroquinone, the monomethyl ether of hydroquinone, etc.

The time required to accomplish the reaction depends on functional factors such as the reactivity of the vinyl ester and the sulfenyl halide, the temperature of the reaction, the presence or absence of catalysts, etc. Reaction rates and times of reaction may also vary considerably, depending on details of apparatus and other operational conditions. By modification of the apparatus, continuous procedures may be substituted for the batch-type operations described below.

Conveniently the course of the reaction is followed by observing the change in color of the reaction mixture. Sulfenyl halides are generally a deep red shade; as the reaction proceeds, the color of the reaction mixture generally lightens, gradually becoming a clear yellow or orange shade by the time all of the sulfenyl halide has reacted. On completion of the reaction, the product may be isolated by removing solvents and unreacted components by procedures such as decantation, evaporation or distillation. It is to be noted that elevated distillation temperatures appear to promote dehydrochlorination of the present products, and the use of such elevated temperatures should be avoided unless the dehydrohalogenated product is the object of the synthesis.

As exemplary of the process of the invention, there is described the following non-limiting exemplary operation.

*Example*

To 17.2 g. (0.2 mole) of freshly-distilled vinyl acetate mixed with 100 ml. of glacial acetic acid was added 35.9 g. (0.2 mole) of p-chlorobenzenesulfenyl chloride. There was an immediate exothermic reaction, raising the temperature of the reaction mixture to 70° C. in about one minute, while the red color of the sulfenyl halide disappeared leaving the reaction mixture as a faintly yellow liquid. By removal of the acetic acid via distillation, a reaction product comprising compounds containing sulfur atoms and carboxylate radicals was obtained as a light yellow liquid. The liquid product could not be distilled, but darkened at a temperature of 140° C. at 0.7 mm. to a dark red color. The crude product, after decolorization with charcoal, weighed 40 g., $n_D^{25}$ 1.5902. Elementary analysis indicated the product to contain 48.9% carbon, 3.41% hydrogen, 17.25% chlorine and 14.73% sulfur.

Similarly, by the addition of pentachlorobenzenesulfenyl chloride to vinyl acetate in the presence of acetic acid, there is obtained a reaction product comprising componds containing sulfur atoms and carboxylate radicals and probably containing a chloro(pentachlorophenylthio)ethyl acetate; by the addition of p-bromobenzenesulfenyl bromide to vinyl butyrate, there is produced a reaction product comprising compounds containing sulfur atoms and carboxylate radicals and wherein bromine atoms are present.

The new ester products are relatively stable materials, ranging from oils to solids, which are soluble in a variety of organic solvents, e. g., acetone, benzene, ether and ethanol, and substantially insoluble in water. They are useful for a variety of agricultural and industrial purposes, and may be used, e. g., as nematocides, herbicides, algicides, agricultural fungicides, insecticides, miticides and microbiological toxicants. The new products are particularly useful as bactericides and fungicides and are adapted to be employed as the active toxicant constituents of compositions for the control of microbiological organisms. This utility is illustrated by incorporating one of the present products in a growth medium for bacteria and fungi at a concentration, e. g., of 0.1%, whereby the medium is rendered incapable of supporting the growth of bacterial and fungal organisms, such as *Micrococcus pyogenes* var. *aureus*, *Salmonella typhosa*, etc.

For use as a pesticide, the present compounds may be employed as constituents of organic solutions, aqueous dispersions and emulsions, or dusting formulations prepared by mixing the toxic compounds with an inert finely divided powder. They may be employed as disinfecting and preserving agents in the textile industry for preserving fabrics or for disinfecting bandage material, instruments, the skin, surfaces such as floors and walls and the like, and also for disinfecting and preserving cosmetics and nutrient substances.

It is also contemplated that the presently provided sulfur-containing reaction products of vinyl esters of carboxylic acids with halogenated aromatic sulfenyl halides may be converted by oxidation (e. g., with hydrogen peroxide in acetic acid, potassium permanganate, chromic acid, etc.) into the corresponding sulfoxides and sulfones.

While the invention has been illustrated with reference to particular preferred embodiments thereof, it will be appreciated that variations can be made without departing from the spirit and scope of the invention.

What is claimed is:

1. The method which comprises contacting a sulfenyl halide selected from the class consisting of benzenesulfenyl bromides and chlorides wherein the benzene ring of said benzenesulfenyl bromides and chlorides is substituted by from 1 to 5 halogen atoms selected from chlorine and bromine atoms, with a vinyl ester of a saturated aliphatic carboxylic acid of the formula

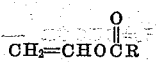

where R represents a lower alkyl radical containing from 1 to 6 carbon atoms, and thereby forming a reaction product comprising compounds containing sulfur atoms and carboxylate radicals.

2. The method of claim 1 wherein the reaction of said sulfenyl halides with said vinyl esters is carried out in the presence of glacial acetic acid.

3. The method which comprises contacting a benzenesulfenyl chloride wherein the benzene ring of said sulfenyl chloride is substituted by from 1 to 5 chlorine atoms with a vinyl ester of a saturated aliphatic lower carboxylic acid containing from 1 to 6 carbon atoms, thereby forming a reaction product comprising compounds containing sulfur atoms and carboxylate radicals.

4. The method which comprises contacting chlorobenzenesulfenyl chloride with vinyl acetate and thereby forming a reaction product comprising compounds containing sulur atoms and carboxylate radicals.

5. The method of claim 4 where said reaction is carried out in the presence of glacial acetic acid.

6. The product of the process of claim 1.

7. The product of the process of claim 3.

8. The product of the process of claim 4.

References Cited in the file of this patent
UNITED STATES PATENTS 2,521,068    Ladd _____ Sept. 5, 1950
2,553,772    Kittleson et al. _____ May 22, 1951

OTHER REFERENCES

Kharasch et al.: J. Am. Chem. Soc. 71 (1949), pp. 2724–8.

Kharasch et al.: J. Am. Chem. Soc. 75 (1953), pp. 3734–7.